United States Patent Office 3,137,665
Patented June 16, 1964

3,137,665
HIGHLY FILLED VINYL POLYSILOXANE
POTTING COMPOSITION
David T. Retford, Midland, Mich., assignor to The Dow Corning Corporation, Midland, Mich., a corporation of Michigan
No Drawing. Filed Nov. 28, 1960, Ser. No. 71,888
6 Claims. (Cl. 260—18)

This invention relates to a new vinyl-containing organosiloxane resin-based potting composition containing a high loading of granular inorganic filler, an organic thickener and a vinyl-specific organic peroxide. This invention also relates to a method for using such a composition.

The employment of high filler loadings in silicone-based potting and encapsulation compositions for electrical applications has been found desirable due to the high electrical insulating values of such fillers, their low thermal expansion coefficient and their low cost in contrast to the cost of the silicone resins used in such compositions. These high filler loadings range up to about 23 parts by weight of filler per part of resin. The most inexpensive and most available fillers are the various types of sand, e.g. granular inorganic materials consisting primarily of silica or metallic silicates. The use of such sand has been up to this time unsatisfactory primarily because of its poor workability in the desired compositions. Potting compositions containing high sand loadings have all the caking and non-flowing properties of any wet sand.

It was recognized that in order to achieve workable compositions which produce in turn satisfactory potting compounds it is necessary both to wet thoroughly and to disperse all of the filler in the resin. In order to accomplish these goals satisfactorily a lower filler-to-resin ratio had to be used than was desired in the final product. The dispersion of filler in resin could be used only if the filler could be made to settle forming the desired highly-filled potting composition covered with a layer of an essentially unfilled resin which could be subsequently drawn off if desired. Unfortunately, fillers which dispersed satisfactorily in silicone resins would not settle, and fillers which would settle out of silicone resins could not be kept dispersed in the resins.

One object of this invention is to provide a silicone-based composition suitable for use in electrical potting and encapsulation applications. Another object of this invention is to provide such a composition which is workable, i.e. it can be moved uniformly under pressure. Another object of this invention is to provide such a composition in which a granular inorganic filler is satisfactorily dispersed but can be made to settle out of the dispersion when desired. Another object of this invention is to provide a method for employing such a composition for potting, encapsulation and the like. These objects as well as others which become apparent from the following description are satisfied by this invention.

This invention relates to a composition consisting essentially of a mixture of (A) a fluid organosilicon compound containing as the silicon-bonded organic radicals phenyl, methyl and vinyl radicals such that there is an average of from 0.3 to 1 vinyl radical per silicon atom, an average of from 0.3 to 1.1 phenyl radicals per silicon atom, an average of no more than two total methyl and phenyl radicals per silicon atom and at least one methyl radical per vinyl radical, from 0.1 to 10 percent by weight based on the weight of A of (B) a vinyl-specific organic peroxide, from 0.1 to 10 percent by weight based on the weight of A of (C) an organic thickener which produces in combination with A a mixture having a dropping point between 30° C. and the activation temperature of B and from 100 to about 2000 percent by weight based on the weight of A of (D) a granular inorganic filler having a particle size greater than 200 mesh (U.S. Sieve) and having a sufficiently high specific gravity to settle out of a dispersion in A at a temperature below the activation temperature of B.

The fluid organosilicon compound A contains as silicon-bonded organic radicals phenyl, methyl and vinyl radicals. This compound A should be resinous on curing. The cure involves linking silicon-bonded vinyl groups to silicon-bonded methyl groups. There must be at least 0.3 silicon-bonded vinyl group per silicon atom to insure adequate cross-linking in the resin, but more than about one such vinyl group per silicon atom deleteriously affects the thermal stability of the cured resin. Since unreacted vinyl groups adversely affect the heat stability of the cured resin, it is very desirable that there be at least one and preferably more than one silicon-bonded methyl group per silicon-bonded vinyl group in A. Experience has shown that there should be from 0.3 to 1.1 silicon-bonded phenyl radicals per silicon atom in A in order to produce a satisfactory product. Preferably there is at least 0.7 phenyl radicals per silicon atom for the best heat stability. In order that a resinous cured product is obtained there must be an average of no more than two total methyl and phenyl radicals per silicon atom.

Compound A can include silane moieties such as $PhMe_2ViSi$, $PhMeVi_2Si$, $Ph_2Vi_2Si$, $Me_2Vi_2Si$ and $$Ph_2MeViSi$$

where Ph, Me and Vi represent the henyl, methyl and vinyl radicals respectively, but A is preferably an organopolysiloxane composition made up of such units as, for example, the $ViSiO_{1.5}$, $MeSiO_{1.5}$, $PhSiO_{1.5}$, $PhMeSiO$, $PhViSiO$, $MeViSiO$, $Ph_2SiO$, $Me_2SiO$, $Vi_2SiO$, $$PhMeViSiO_{0.5}$$

$Ph_2MeSiO_{0.5}$, $Me_2PhSiO_{0.5}$, $Me_2ViSiO_{0.5}$, $Ph_2ViSiO_{0.5}$, $PhVi_2SiO_{0.5}$ and $MeVi_2SiO_{0.5}$ units. Some $SiO_2$ units can also be present, but these are not desirable. Typical siloxane resin compositions which can be employed as compound A herein are described in U.S. Patents 2,894,930 and 2,934,464, issued July 14, 1959, and April 26, 1960, respectively.

The second ingredient in the compositions of this invention is (B) a vinyl-specific organic peroxide, i.e. an organic peroxide which cures A by the interaction of silicon-bonded vinyl groups and silicon-bonded methyl groups. Suitable peroxides are, for example, ditertiary-butyl peroxide, dicumyl peroxide, tertiarybutyl perbenzoate and 2,5-dimethyl-2,5-di-t-butylperoxyhexane.

The third ingredient in the compositions of this invention is (C) an organic thickener as the term is generally applied in the field of lubrication. Thickeners are employed to make greases out of oily liquids. The organic thickeners, which are primarily metal salts of fatty acids or oils and waxes composed of fatty acids, work by various mechanisms. Some form crystals dispersed through the liquid; others form thread-like structures, some long, some short, which are dispersed through the liquid.

Greases prepared using a thickener are at least as sensitive to temperature as the thickener employed. Similarly, the compositions of this invention vary in viscosity with temperature according to the heat sensitivity of the thickener C in combination with the compound A employed. Above the melting point of a thickener there is essentially no thickening effect. Below the melting point of a thickener there may be a point at which there is a marked reduction in viscosity of a combination of the thickener and either the liquid alone or with other thickeners and the liquid. This point known as a dropping point is not a true melting point. There are also certain eutectic mixtures of thickeners in which the melting point of any thickener mixture is lower than the melting point of any member of the mixture. These thickener mixtures can also have lower dropping points in combination with the liquid to be thickened than any member of the thickener mixture in combination with the liquid. In this application the dropping point of a mixture of A and C may coincide with the melting point of C.

The critical feature of the thickeners C employed in this invention is their ability to form mixtures with A which have dropping points at temperatures above room temperature, e.g. 30° C., but below the activation temperature of the peroxide catalyst B. The test to determine the feasibility of using any thickener C with any compound A involves mixing A and C at a temperature above the melting point of C until C is thoroughly dispersed in A, cooling the mixture to room temperature to see if the mixture thickens substantially and reheating the mixture again, checking the mixture viscosity to determine if the mixture has a dropping point below the temperature of activation for the peroxide B to be used.

Examples of suitable commercially available organic thickeners which have melting points sufficiently low to insure forming mixtures having dropping points in the desired range include aluminum tristearate, chromium distearate, cobalt distearate, copper distearate, lead distearate, manganese distearate, strontium distearate, tin tetrastearate, titanium tetrastearate, zinc distearate, zinc dipalmitate, zinc laurate, calcium dioleate, copper dioleate, lead dioleate, mercury dioleate, thallium oleate, zinc dioleate, lard, beef tallow, menhaden oil, sardine oil, hydrogenated herring oil, hydrogenated sardine oil, hydrogenated castor oil, cottonseed oil, palm oil, tung oil, beeswax, carnauba wax, chinese insect wax and montan wax.

The fourth essential ingredient in the compositions of this invention is (D) a granular inorganic filler. This filler must have a particle size greater than 200 mesh (U.S. Sieve) to operate satisfactorily. Generally, the average particle size is less than 2.5 mesh (U.S. Sieve), but it can be greater if desired. The filler D must also have a sufficiently high specific gravity to sink in the fluid A at a temperature no greater than the activation temperature of the peroxide catalyst D. If the filler will sink in A, it will sink in a mixture of A and C above the dropping point of that mixture. Suitable fillers include, for example, granular forms of zirconium orthosilicate, aluminum silicate, calcium silicate, silica, alumina, magnesia, zirconium oxide, silicon carbide, boron carbide and glass. Where electrical conductivity is of no importance such fillers as copper shot, lead shot and iron shot are suitable.

Where granular free metal fillers are employed, up to about 20 parts by weight of filler per part of A can be employed to ultimately give a cured filled resin containing 23 parts of filler per part of A. However, where other than free metal fillers, i.e. non-metallic fillers, are employed, the practical maximum for workability is about eight parts by weight of filler per part of A to give a cured filled resin containing 9 parts of filler per part of A. Preferably, in both cases at least one part of filler per part of A is employed in order to keep within reasonable limits the amount of total composition which must be handled to achieve the desired highly filled product.

The compositions of this invention are best prepared by mixing A and C and heating the mixture until A and B are thoroughly mixed, allowing the mixture to cool to room temperature and adding the peroxide B and filler D.

The compositions of this invention are useful for encapsulation, potting and molding applications where highly filled cured silicone resins are desired. They are especially useful for sealing electrical equipment where the filler is not conductive.

These compositions are employed by introducing the composition into the desired space, heating the composition in place to a temperature above its dropping point, i.e. essentially the dropping point of a mixture of A and C, but below the activation temperature of B until the filler D settles out and heating the composition above the activation temperature of B until A is cured.

The following examples are merely illustrative and are not intended to limit this invention the scope of which is properly delineated in the claims. All amounts are in parts by weight.

*Example 1*

A mixture of 52.5 parts of a siloxane copolymer M composed of 60.2 mol percent phenylmethylsiloxane units, 35 mol percent phenylvinylsiloxane units and 4.8 mol percent phenylmethylvinylsiloxane units, 25 parts of a siloxane copolymer N composed of 55 mol percent phenylmethylsiloxane units, 30 mol percent monomethylsiloxane units and 15 mol percent monophenylsiloxane units, copolymers M and N each containing no more than 0.1 weight percent of silicon-bonded hydroxyl groups, 22.5 parts of sym-diphenyldimethyldivinyldisiloxane, 2 parts of dicumylperoxide, 0.25 part of N,N-dimethyltoluidine as a cure accelerator and 5 parts of a commercial hydrogenated castor oil was heated to 90° C. until a single phase solution formed. The solution was cooled to room temperature and 600 parts of a zirconium orthosilicate sand having an average particle size of 120 mesh (U.S. Sieve) were dispersed in the cooled solution. A vacuum was temporarily applied to the system to remove any entrapped air.

A sample of this degassed mixture was poured into a bottle and heated for 3 hours at 150° C. As the system was being heated to temperature the zirconium orthosilicate sand settled to the bottom. The resulting product was a cured resin, the bottom portion of which had a ratio of about 9 parts of sand per part of resin and the top part of which was free of sand.

A tubular resistance heater packed with magnesia was heated to 150° C. Another sample of the degassed mixture was poured into the ends of the heater. The sand settled out of the mixture as it was added and simultaneously heated, and the clear resin portions were allowed to overflow. The filled resin was cured for 3 hours at 150° C. sealing the magnesia in the heater from moisture attack.

The unused portion of the degassed mixture has shown no sand settling after over 8 months at room temperature.

*Example 2*

A mixture of 83 parts of copolymer M, 17 parts of sym-diphenyldimethyldivinyldisiloxane, 1.5 parts of dicumylperoxide and 5 parts of a commercial hydrogenated caster oil was heated to 90° C. until a single phase solution formed. The solution was cooled to room temperature, and 600 parts of a zirconium orthosilicate sand having an average particle size of 120 mesh (U.S. Sieve) were dispersed in the cooled solution. A vacuum was temporarily applied to the system to remove any entrapped air.

A sample of this degassed mixture was poured into a bottle and heated 3 hours at 150° C. As the system was being heated to temperature, the zirconium orthosilicate sand settled to the bottom. The resulting product was a cured resin, the bottom portion of which had a ratio of about 9 parts of sand per part of resin and the top part of which was sand-free resin.

The unused portion of the degassed mixture has shown no sand settling after over 6 mounths at room temperature

*Example 3*

A mixture of 100 parts of copolymer M and one part of a commercial hydrogenated castor oil was heated to 90° C. until a single phase solution formed. The solution was cooled to room temperature. One part of ditertiarybutyl peroxide and 500 parts of zicronium orthosilicate sand having an average particle size of 120 mesh (U.S. Sieve) were dispersed in the cooled solution. A vacuum was temporarily applied to the system to remove any entrapped air.

A sample of this degassed mixture was poured into a bottle and heated 3 hours at 150° C. The result was the same as that achieved in Example 2.

The unused portion of the degassed mixture has shown slight sand settling after 2 months at room temperature.

*Example 4*

Two mixtures were prepared. Mixture R consisted of 100 parts of copolymer M and 5 parts of zinc distearate. Mixture S consisted of 100 parts of copolymer M and 5 parts of carnauba wax. Each mixture was heated to 90° C. until a single phase solution formed. The solutions were cooled to room temperature. One part of 2,5-dimethyl-2,5-di-t-butylperoxyhexane and 500 parts of zirconium orthosilicate sand having an average particle size of 120 mesh (U.S. Sieve) were dispersed in each cooled solution. A vacuum was temporarily applied to each system to remove any entrapped air.

A sample of each degassed mixture was poured into a bottle and heated 3 hours at 150° C. The results were essentially the same as that achieved in Example 2.

The unused portions of the degassed mixtures have shown no sand settling after 16 hours at room temperature.

The results are similar when fused alumina having an average particle size of 30 mesh (U.S. Sieve) and silica sand having an average particle size of 150 mesh (U.S. Sieve) are each substituted for the zirconium orthosilicate sand above.

*Example 5*

When aluminum tristearate, tin tetrastearate, zinc dioleate and palm oil are each substituted for the hydrogenated castor oil in Example 2, the results in each case are similar to that achieved in Example 2.

That which is claimed is:

1. A composition consisting essentially of a mixture of (A) a fluid organosilicon compound containing as the silicon-bonded organic radicals phenyl, methyl and vinyl radicals such that there is an average of from 0.3 to 1 vinyl radical per silicon atom, an average of from 0.3 to 1.1 phenyl radicals per silicon atom, an average of no more than two total methyl and phenyl radicals per silicon atom and at least one methyl radical per vinyl radical the remaining valences of the silicon in said organosilicon compound being satisfied by an oxygen atom of an SiOSi linkage, from 0.1 to 10 percent by weight based on the weight of A of (B) a vinyl-specific organic peroxide, from 0.1 to 10 percent by weight based on the weight of A of (C) an organic thickener which produces in combination with A a mixture having a dropping point between 30° C. and the activation temperature of B and from 100 to about 2000 percent by weight based on the weight of A of (D) a granular inorganic filler having a particle size greater than 200 mesh (U.S. Sieve) and having a sufficiently high specific gravity to settle out of a dispersion in A at a temperature below the activation temperature of B.

2. The composition of claim 1 in which the fluid organosilicon compound A contains from 0.3 to 0.7 vinyl group per silicon atom and from 0.7 to 1 phenyl radical per silicon atom.

3. A composition consisting essentially of a mixture of (A) a fluid organosilicon compound containing as the silicon-bonded organic radicals phenyl, methyl and vinyl radicals such that there is an average of from 0.3 to 1 vinyl radical per silicon atom, an average of from 0.3 to 1.1 phenyl radicals per silicon atom, an average of no more than two total methyl and phenyl radicals per silicon atom and at least one methyl radical per vinyl radical the remaining valences of the silicon in said organosilicon compound being satisfied by an oxygen atom of an SiOSi linkage, from 0.1 to 10 percent by weight based on the weight of A of (B) a vinyl-specific organic peroxide, from 0.1 to 10 percent by weight based on the weight of A of (C) an organic thickener which produces in combination with A a mixture having a dropping point between 30° C. and the activation temperature of B and from 100 to about 800 percent by weight based on the weight of A of (D) a granular inorganic non-metallic filler having a particle size greater than 200 mesh (U.S. Sieve) and having a sufficiently high specific gravity to settle out of a dispersion in A at a temperature below the activation temperature of B.

4. A method of producing a cured molded highly filled silicone resin which comprises (1) preparing a mixture of (A) a fluid organosilicon compound containing as the silicon-bonded organic radicals phenyl, methyl and vinyl radicals such that there is an average of from 0.3 to 1.0 vinyl radical per silicon atom, an average of from 0.3 to 1.1 phenyl radicals per silicon atom, an average of no more than two methyl and phenyl radicals per silicon atom and at least one methyl radical the remaining valences of the silicon in said organosilicon compound being satisfied by an oxygen atom of an SiOSi linkage, per vinyl radical, from 0.1 to 10 percent by weight based on the weight of A of (B) a vinyl-specific organic peroxide, from 0.1 to 10 percent by weight based on the weight of A of (C) an organic thickener which produces in combination with A a mixture having a dropping point between 30° C. and the activation temperature of B and from 100 to about 2000 percent by weight based on the weight of A of (C) a granular inorganic filler having a particle size greater than 200 mesh (U.S. Sieve) and having a sufficiently high density to settle out of a dispersion in A at a temperature below the activation temperature of B, (2) introducing this mixture into the desired space, (3) heating the mixture in place to a temperature above the dropping point of the combination of A and C but below the activation temperature of B until the filler D settles and (4) heating the system above the activation temperature of B until the resin A is cured.

5. The method of claim 4 in which the fluid organosilicon compound A contains from 0.3 to 0.7 vinyl group per silicon atom and from 0.7 to 1 phenyl radical per silicon atom.

6. A method of producing a cured molded highly filled silicone resin which comprises (1) preparing a mixture of (A) a fluid organosilicon compound containing as the silicon-bonded organic radicals phenyl, methyl and vinyl radicals such that there is an average of from 0.3 to 1.0 vinyl radical per silicon atom, an average of from 0.3 to 1.1 phenyl radicals per silicon atom, an average of no more than two methyl and phenyl radicals per silicon atom and at least one methyl radical the remaining valences of the silicon in said organosilicon compound being satisfied by an oxygen atom of an SiOSi linkage, per vinyl radical, from 0.1 to 10 percent by weight based on the weight of A of (B) a vinyl-specific organic peroxide, from 0.1 to 10 percent by weight based on the weight of A of (C) an organic thickener which produces in combination with A a mixture having a dropping point between 30° C. and the activation temperature of B and from 100 to about 800 percent by weight based on the weight of A of (C) a granular inorganic non-metallic filler having a particle size greater than 200 mesh (U.S. Sieve) and having a sufficiently high density to settle out of a dispersion in A at a temperature below the activation temperature of B, (2) introducing this mixture into the desired space, (3) heating the mixture in place to a temperature above the dropping point of the combination of A and C but below the activation temperature of B until the filler D settles and (4) heating the system above the activation temperature of B until the resin A is cured.

References Cited in the file of this patent

FOREIGN PATENTS 559,241     Canada _____ June 24, 1958